US011106622B2

(12) United States Patent
Narasimhan et al.

(10) Patent No.: US 11,106,622 B2
(45) Date of Patent: Aug. 31, 2021

(54) FIRMWARE UPDATE ARCHITECTURE WITH OS-BIOS COMMUNICATION

(71) Applicant: Dell Products L.P., Round Rock, TX (US)

(72) Inventors: Krishnakumar Narasimhan, Chennai (IN); Santosh Hanamant Gore, Bangalore (IN); Reveendra Babu Madala, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/409,223

(22) Filed: May 10, 2019

(65) Prior Publication Data

US 2020/0356357 A1 Nov. 12, 2020

(51) Int. Cl.
| | |
|---|---|
| *G06F 9/44* | (2018.01) |
| *G06F 15/167* | (2006.01) |
| *G06F 9/4401* | (2018.01) |
| *G06F 8/654* | (2018.01) |
| *G06F 3/06* | (2006.01) |
| *G06F 9/455* | (2018.01) |
| *H04L 29/08* | (2006.01) |
| *G06F 11/14* | (2006.01) |

(52) U.S. Cl.
CPC .......... *G06F 15/167* (2013.01); *G06F 3/0632* (2013.01); *G06F 8/654* (2018.02); *G06F 9/4401* (2013.01); *G06F 9/455* (2013.01); *G06F 11/1433* (2013.01); *H04L 67/34* (2013.01)

(58) Field of Classification Search
CPC .... G06F 9/4406; G06F 9/4403; G06F 3/0632; G06F 21/57; G06F 21/575; G06F 8/65; G06F 11/1433; G06F 15/167; G06F 9/455; G06F 8/654; G06F 9/4401; H04L 41/082; H04L 67/34
See application file for complete search history.

(56) References Cited

U.S. PATENT DOCUMENTS

| | | | | |
|---|---|---|---|---|
| 4,665,482 | A * | 5/1987 | Murray, Jr. ........... | G06F 15/167 710/22 |
| 6,647,494 | B1 * | 11/2003 | Drews ................... | H04L 41/082 713/1 |
| 2006/0031664 | A1 * | 2/2006 | Wilson .................... | H04L 67/34 713/1 |
| 2008/0028385 | A1 * | 1/2008 | Brown ...................... | G06F 8/65 717/170 |
| 2011/0154484 | A1 * | 6/2011 | Shimabe ............... | G06F 21/575 726/19 |
| 2013/0185799 | A1 * | 7/2013 | Pfeifer .................... | G06F 21/57 726/24 |

(Continued)

*Primary Examiner* — Tuan A Vu
(74) *Attorney, Agent, or Firm* — Norton Rose Fulbright US LLP

(57) ABSTRACT

An operating system (OS) may communicate with a basic input/output system (BIOS) at OS runtime to inform the BIOS of a firmware update storage location. A method may begin with receiving, by an OS, an update for a firmware of an information handling system. The OS may select a memory for storage of the firmware update and may store the firmware update in the selected memory. The OS may then store a location of the firmware update in a portion of a memory accessible by both the OS and the BIOS.

19 Claims, 10 Drawing Sheets

(56) References Cited

U.S. PATENT DOCUMENTS

| | | | |
|---|---|---|---|
| 2013/0227090 A1* | 8/2013 | Nissler | G06F 21/57 |
| | | | 709/220 |
| 2016/0170736 A1* | 6/2016 | Landry | G06F 11/1433 |
| | | | 717/168 |
| 2016/0188345 A1* | 6/2016 | Chen | G06F 9/4403 |
| | | | 713/2 |
| 2018/0276002 A1* | 9/2018 | Roszak | G06F 9/4406 |
| 2019/0243637 A1* | 8/2019 | Nachimuthu | G06F 3/0632 |
| 2019/0251264 A1* | 8/2019 | Jayakumar | G06F 9/455 |

* cited by examiner

FIRMWARE UPDATE ARCHITECTURE WITH OS-BIOS COMMUNICATION

FIELD OF THE DISCLOSURE

The instant disclosure relates to firmware updates. More specifically, portions of this disclosure relate to communication of firmware update information between an operating system and a BIOS of an information handling system.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a basic input/output system (BIOS) containing instructions for initializing and testing hardware components of the information handling system and/or to load an Operating System (OS) of the information handling system. In some cases the BIOS may operate according to the unified extensible firmware interface (UEFI) specification, while in other cases the BIOS may be a legacy BIOS. Some information handling systems may support selectively booting with a legacy BIOS configuration and a UEFI BIOS configuration.

Information handling systems may receive firmware updates at OS runtime. For example, an information handling system may receive a firmware update via a wireless connection or via a computer readable medium such as a flash drive, external hard drive, or other medium physically connected to the information handling system. Updating BIOS firmware may be time-consuming, requiring three or more reboots to make the firmware update available for application to the BIOS and to apply the update. Information handling systems may also lack contiguous memory area for storage of firmware updates, which may increase the amount of time required to apply a firmware update. Memory errors and volatility when maintaining and transferring a firmware update across reboots may corrupt the firmware update. Furthermore, some information handling systems utilize complementary metal-oxide semiconductor (CMOS) memory for applying the firmware update to the BIOS, which may introduce security vulnerabilities. In particular, legacy BIOS systems may transfer a firmware update using CMOS memory to prepare the update for application, which can lead to system security breaches. Application of a firmware update, received at OS runtime may require multiple reboots, increasing the amount of time required for application of the update, and may introduce security vulnerabilities.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An OS of an information handling system may communicate firmware update information with a BIOS of the information handling system via a shared mailbox located in a memory accessible by both the BIOS and the OS. For example, when an information handling system receives a firmware update, at OS runtime, the OS may store the firmware update in a memory of the information handling system. The OS may record information regarding the firmware update storage location in the shared mailbox. For example, the OS may record an indication of a memory on which the firmware update is stored and an address of the location within the memory where the firmware update is stored in the shared mailbox. The BIOS may retrieve the firmware update location information from the shared mailbox. Using the firmware update location information, the BIOS may update variables stored in a memory accessible by the BIOS following a reboot, such as in UEFI variables of a firmware memory, to inform the BIOS of a storage location of the firmware update upon a subsequent reboot. When the information handling system reboots for application of the firmware update, the BIOS may access the stored firmware update location information to determine the location at which the firmware update is stored. The BIOS may access the firmware update and may apply the firmware update without requiring three or more reboots or transfer of the firmware update between multiple memory units. Communication of update information between an OS and a BIOS via a shared mailbox may enhance a user experience by reducing a number of reboots required for application of a firmware update and thus also reducing the amount of time required for application of a firmware update. Communication of update information via the shared mailbox may also reduce security vulnerabilities and a risk of corruption of a firmware update by reducing or eliminating the need to transfer the firmware update using CMOS memory.

An OS may notify a BIOS of a storage location of a firmware update via a shared mailbox, accessible by both the OS and the BIOS. For example, a method for updating firmware of an information handling system may begin with receiving, by an OS, an update for a firmware of the information handling system. The firmware update may, for example, be a BIOS firmware update. The update may be received at OS runtime via communication over a wireless network, via a computer readable medium such as a flash drive, hard disk, or other medium, or via another means of communication.

When the OS receives a firmware update, it may select a memory for storage of the firmware update. For example, an information handling system may include one or more memories available for storage of a firmware update, such as system memory, a solid state memory, such as a non-volatile dual in-line memory module (NVDIMM), and/or a hard drive. In some embodiments, the OS may store the firmware update on a system memory in preference over a solid state memory or a hard disk. Application of a firmware update from the system memory may, for example, require less time than application of a firmware update from other memories. In some cases, however, a system memory may not be configured for storage of a firmware update. For example, the system memory may be incapable of storing a firmware update across one or more reboots of the information handling system. If the system memory is unavailable for storage of a firmware update, the OS may store the firmware update in a solid state drive, such as an NVDIMM. The solid state drive may provide the BIOS with faster access to the firmware update than a hard disk, but slower access than a system memory. If neither a system memory nor a solid state memory is unavailable for storage of the firmware update, the OS may store the firmware update on a hard disk of the information handling system. In some embodiments, the OS may be configured to store the firmware update on a specific memory, such as a hard disk, even when other memories are available for firmware update storage. After selecting a memory for storage of the firmware update, the OS may store the firmware update in the selected memory. The firmware update may be stored at a single location, such as within a single partition. When the firmware update is stored at a single location, using a scatter gather method to assemble the firmware update for application to the BIOS may be avoided, reducing an amount of time required to apply the firmware. Reduced update time may enhance a user experience.

The OS may store a location of the firmware update in a mailbox shared between the OS and the BIOS of the information handling system. For example, the OS may store location information detailing a memory in which the firmware update is stored and an address for the location within the memory at which the firmware update is stored. The mailbox may be located on a memory accessible by both the BIOS and the OS, such as a system memory or a firmware NVRAM. The memory on which the shared mailbox is stored may be a second memory of the information handling system. In some embodiments, the shared mailbox may be located on the memory where the firmware update is stored, while in other embodiments the shared mailbox may be located on another memory of the information handling system.

The BIOS may retrieve the location of the update from the shared mailbox. The BIOS may then store the location of the firmware update in a firmware memory, such as a firmware non-volatile random access memory (NVRAM). For example, the BIOS may store location information detailing the location at which the firmware update is stored in one or more UEFI variables of the firmware NVRAM, accessible by the BIOS when the information handling system is booting.

After the BIOS has stored the location of the firmware update in the firmware memory, the BIOS may store a status notification in the shared mailbox indicating that the location of the firmware update has been stored in the firmware memory. The OS may retrieve the status notification from the shared mailbox. In some embodiments, the OS may reboot after retrieving the status notification, to allow the BIOS to apply the firmware update.

Information stored in the shared mailbox may be authenticated. For example, when the OS stores firmware update location information in the shared mailbox, the OS may also store authentication information, such as a specific sequence of commands including a secure caller identifier. The BIOS may verify that the authentication information matches authentication information stored by the BIOS before storing the location information in the firmware NVRAM. Likewise, when the BIOS stores status information in the shared mailbox, the BIOS may also store authentication information, such as a specific sequence of commands including a secure caller identifier. The OS may verify that the authentication information matches an internally stored sequence of information before retrieving the status information.

When an information handling system reboots to apply a firmware update, the BIOS may access firmware update location information specifying a location at which a firmware update is stored, reducing the number of reboots needed to apply the firmware update. A method for updating a firmware of an information handling system may begin with determining, by a BIOS, that a firmware update is ready for installation. For example, when a BIOS is initializing an information handling system, it may check a variable in a memory accessible by the BIOS to determine whether the variable is set to indicate that a firmware update is ready to be applied. The variable may, for example, be a UEFI variable of a firmware NVRAM.

The BIOS may then determine a memory in which the firmware update is stored. Such a determination may include a determination of a location within the memory at which the firmware update is stored, such as a memory address at which the firmware update is stored. For example, the BIOS may access location information stored in a firmware memory to determine the location at which the firmware update is stored. The BIOS may access the location information at one or more UEFI variables stored in the firmware NVRAM. Based on the memory in which the firmware update is stored, the BIOS may load one or more drivers for the memory in which the firmware update is stored. For example, if the firmware update is stored in an NVDIMM, the BIOS may load one or more drivers for operating the NVDIMM.

The BIOS may then access the firmware update and may update the firmware of the information handling system using the firmware update. In some cases the BIOS may determine that the firmware update is stored at a plurality of locations on a system memory and may coalesce the firmware update from the plurality of locations into a single payload at a single location of the system memory. The BIOS may then access the firmware update at the single location and may update the firmware using the single payload. In some cases, the BIOS may determine that the firmware update is stored in a portion of a NVDIMM or hard disk and may transfer the firmware update from the NVDIMM or hard disk to the system memory before updating the firmware. After the firmware update is applied, the BIOS may reallocate the portion of the NVDIMM or hard disk used to store the firmware update for use by the OS. In some embodiments, the information handling system may reboot following application of the firmware update. Thus, the amount of time required for application of an update to a firmware of an information handling system may be reduced, and security of the information handling system may be enhanced.

An information handling system may include a processor for performing the steps described herein. Instructions for performing the steps described herein may be stored on a non-transitory computer readable medium.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
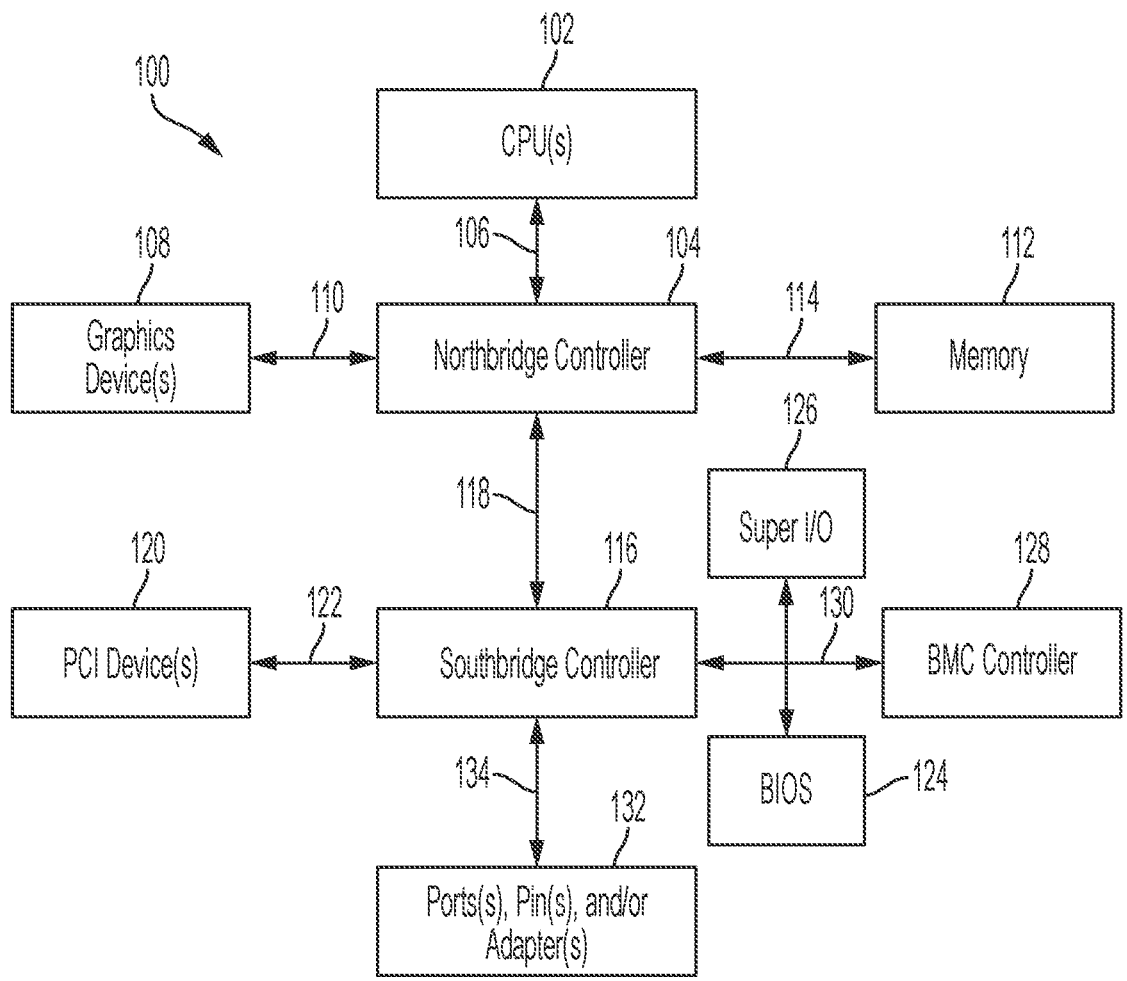
FIG. 1 is a schematic block diagram of an example information handling system according to some embodiments of the disclosure.

An information handling system may include a variety of components to generate, process, display, manipulate, transmit, and receive information. One example of an information handling system 100 is shown in FIG. 1. IHS 100 may include one or more central processing units (CPUs) 102. In some embodiments, IHS 100 may be a single-processor system with a single CPU 102, while in other embodiments IHS 100 may be a multi-processor system including two or more CPUs 102 (e.g., two, four, eight, or any other suitable number). CPU(s) 102 may include any processor capable of executing program instructions. For example, CPU(s) 102 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA.

CPU(s) 102 may be coupled to northbridge controller or chipset 104 via front-side bus 106. The front-side bus 106 may include multiple data links arranged in a set or bus configuration. Northbridge controller 104 may be configured to coordinate I/O traffic between CPU(s) 102 and other components. For example, northbridge controller 104 may be coupled to graphics device(s) 108 (e.g., one or more video cards or adaptors, etc.) via graphics bus 110 (e.g., an Accelerated Graphics Port or AGP bus, a Peripheral Component Interconnect or PCI bus, etc.). Northbridge controller 104 may also be coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory. In some embodiments memory 112 may include NVRAM. In other embodiments, NVRAM may be separately included in or coupled to CPU 102.

Northbridge controller 104 may be coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHSs attached to a network. In various embodiments, southbridge controller 116 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 116 may also enable connection to one or more keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 may be further coupled to one or more PCI devices 120 (e.g., modems, network cards, sound cards, video cards, etc.) via PCI bus 122. Southbridge controller 116 may also be coupled to Basic I/O System (BIOS) 124, Super I/O Controller 126, and Baseboard Management Controller (BMC) 128 via Low Pin Count (LPC) bus 130.

BIOS 124 may include non-volatile memory, such as NVRAM, having program instructions stored thereon. The instructions stored on the BIOS may be usable CPU(s) 102 to initialize and test other hardware components and/or to load an Operating System (OS) onto IHS 100, for example during a booting of an information handling system. The NVRAM of the BIOS may store a boot flag and instructions for performing a quick boot or a detailed boot based on a status of the boot flag. In some embodiments, the NVRAM of the BIOS may also store a boot map and booting information for performing a quick boot. As such, BIOS 124 may include a firmware interface that allows CPU(s) 102 to load and execute certain firmware. In some cases, such firmware may include program code that is compatible with the Unified Extensible Firmware Interface (UEFI) specification, although other types of firmware may be used.

BMC controller 128 may include non-volatile memory having program instructions stored thereon that are usable by CPU(s) 102 to enable remote management of IHS 100. For example, BMC controller 128 may enable a user to discover, configure, and manage BMC controller 128, setup configuration options, resolve and administer hardware or software problems, etc. Additionally or alternatively, BMC controller 128 may include one or more firmware volumes, each volume having one or more firmware files used by the BIOS' firmware interface to initialize and test components of IHS 100.

Super I/O controller 126 may combine interfaces for a variety of lower bandwidth or low data rate devices. Those devices may include, for example, floppy disks, parallel ports, keyboard and mouse, temperature sensor and fan speed monitoring, etc. For example, the super I/O controller 126 may be coupled to the one or more upstream sensors 106 and to the one or more downstream sensors 108.

In some cases, IHS 100 may be configured to access different types of computer-accessible media separate from memory 112. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 100 via northbridge controller 104 and/or southbridge controller 116.

In some implementations, northbridge controller 104 may be combined with southbridge controller 116, and/or be at least partially incorporated into CPU(s) 102. In other implementations, one or more of the devices or components shown in FIG. 1 may be absent, or one or more other components may be added. Accordingly, systems and methods described herein may be implemented or executed with other computer system configurations. In some cases, various elements shown in FIG. 1 may be mounted on a motherboard and protected by a chassis or the like.

Figure 2:
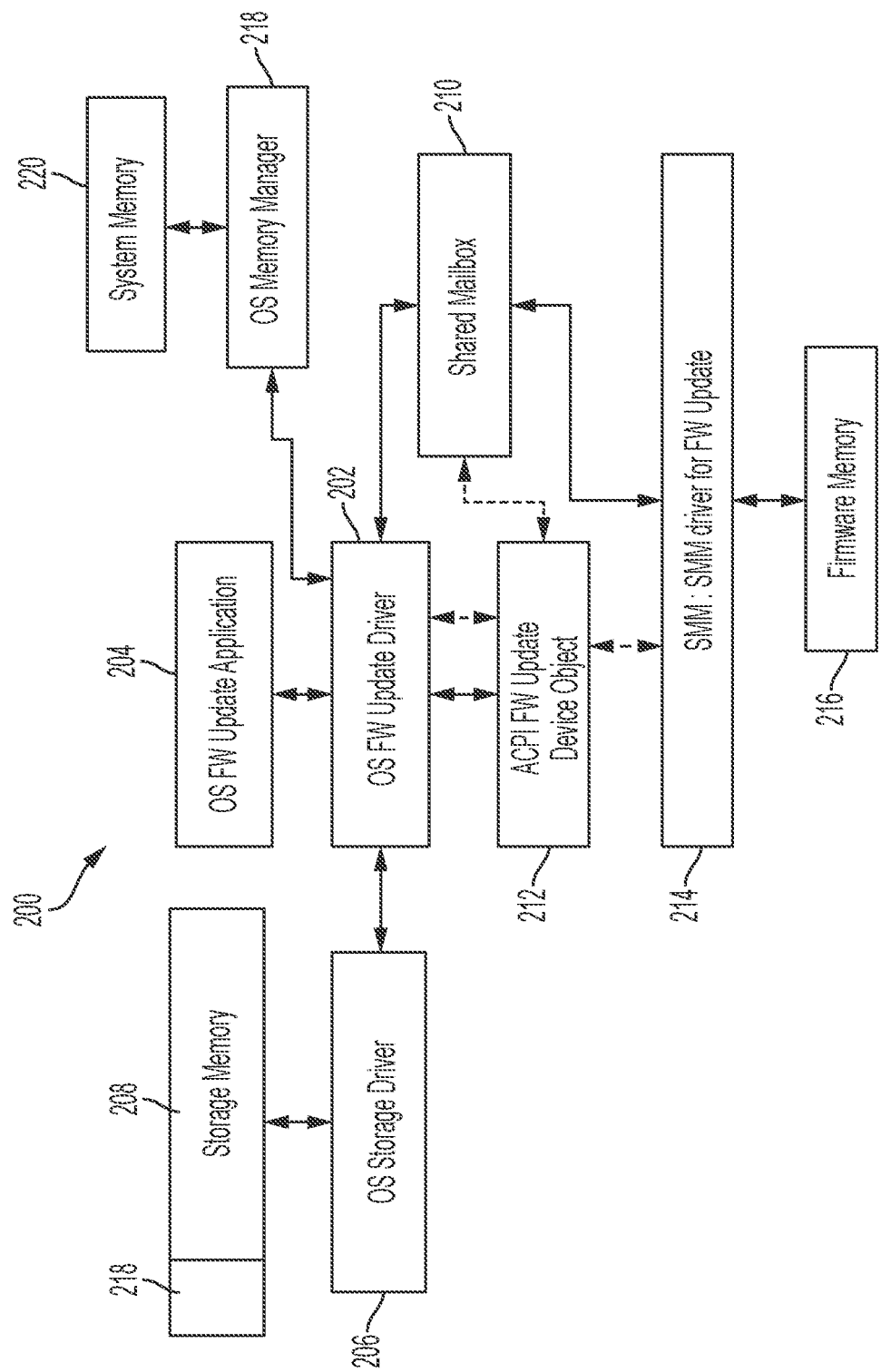
FIG. 2 is a block diagram of an example system for exchange of update status information between an operating system and a BIOS according to some embodiments of the disclosure.

An OS may communicate with a BIOS via a shared mailbox to exchange firmware update information. An example information handling system 200, shown in FIG. 2, may include an OS firmware update driver 202. The OS firmware update driver 202 may be a software component executed by an operating system of the information handling system 200. The OS firmware update driver 202 may be configured to control receipt and storage of a firmware update and to communicate with a BIOS of the information handling system regarding the firmware update. The OS firmware update driver 202 may communicate with an advanced configuration and power interface (ACPI) firmware device object 212 of the BIOS of the information handling system 200 to facilitate communication between the OS and the BIOS. In some embodiments, the OS firmware update driver 202 may be installed in ACPI firmware update device object 212. The OS firmware update driver 202 may also communicate with an OS firmware update application 204 to facilitate receipt of a firmware update and application of the firmware update to the BIOS.

The OS firmware update driver 202 may, for example, communicate with the ACPI firmware update device object 212 to obtain a location of shared mailbox 210. For example, upon startup of an information handling system or receipt of a firmware update, the OS firmware update driver 202 may query the ACPI firmware update device object 212 for a memory address of shared mailbox 210. The shared mailbox 210 may be set up by the BIOS while booting the information handling system, and the BIOS may provide the ACPI firmware update device object 212 with information regarding the location of the mailbox. The shared mailbox 210, may, for example, be a portion of a system memory 220. In other embodiments, the shared mailbox 210 may be a portion of a hard disk, a solid state drive, such as an NVDIMM, or a firmware memory, such as a firmware NVRAM. The BIOS may, when booting, allocate a portion of a memory, such as by creating a partition, for the shared mailbox 210. The OS firmware update driver 202 may also query the ACPI firmware update device object 212 for information regarding firmware update support of the information handling system 200 to use in staging a firmware update on a memory of the information handling system 200. The firmware update support information may, for example, include information specifying a memory on which a firmware update should be stored.

The ACPI firmware update device object 212 may be created by the BIOS at the time of compilation and may be utilized as a device node for installation of the OS firmware update driver 202 and to facilitate resource exchange information between the BIOS and the OS. For example, the ACPI firmware update device object 212 may communicate BIOS capability to process a firmware update from one or more memory locations and/or a location in memory, such as a physical address, of the shared mailbox 210 with the OS firmware update driver 202. The ACPI firmware update device object 212 may further communicate BIOS support for authentication, such as authentication information including a pre-shared sequence between the OS firmware update driver 202 and the SMM 214, trust zone information, commands to alert the SMM 214 and/or ACPI firmware update driver 212 that information has been stored in the shared mailbox 210, and other firmware update event status information.

A firmware update may be received by the OS firmware update application 204. The OS firmware update driver 202 may store the firmware update in a memory of the information handling system 200. The firmware update may be stored in a system memory 220, such as a system main memory, or a storage memory 208, such as a solid state drive or hard disk. The OS firmware update driver 202 may determine the memory for storage of the firmware update based on information regarding firmware update support received from the ACPI firmware update device object 212. If the system memory 220 is capable of storing a firmware update across one or more reboots, the OS firmware update driver 202 may request a memory allocation for storage of the firmware update on the system memory 220 from the OS memory manager 218. The OS firmware update driver 202 may then store the firmware update on the system memory 220. In some embodiments, the OS memory manager 218 may allocate multiple areas of the system memory 220 for storage of portions of the firmware update. If the system memory 220 is not capable of storing a firmware update across one or more reboots and/or if the system is configured to store the firmware update in storage memory 208, the OS firmware update driver 202 may request that the OS storage driver 206 create a partition 218 on the storage memory for storage of the firmware update. The OS storage driver 206 may create the partition 218 and may provide information regarding the location of the partition 218 to the OS firmware update driver 202. The OS firmware update driver 202 may then store the firmware update in the partition 218.

The OS firmware update driver 202 may store location information for the firmware update, such as a memory on which the firmware update is stored and an address within the memory at which the firmware update is stored, in the shared mailbox 210. For example, the OS firmware update driver 202 may store a logical block address for the firmware update, a cylinder head sector for the firmware update, a device path to the memory on which the firmware update is stored, such as a device path of a hard drive, or one or more non-uniform memory access (NUMA) nodes at which the firmware update is stored, in the shared mailbox 210. The OS firmware update driver 202 may also store authentication information in the shared mailbox 202, such as sequence commands including a secure caller identifier for authentication of firmware update location information to be used by the BIOS to authenticate the firmware update location information.

The SMM 214 may retrieve the firmware update location information from the shared mailbox 210. For example, the OS firmware update driver 202 may inform the SMM 214 via the ACPI firmware update device object 212 that firmware update location information has been stored in the shared mailbox 210. The SMM 214 may retrieve authentication information, along with firmware update location information, from the shared mailbox 210 to authenticate location information retrieved from the shared mailbox 210. The SMM 214 may store location information in the firmware memory 216. The firmware memory 216 may be a firmware NVRAM of the information handling system accessible by the BIOS while the information handling system is booting. The SMM 214 may, for example, store the firmware location information in one or more UEFI vari-ables of the firmware memory 216. The SMM 214 may store operation status information, such as one or more operation status reports in the shared mailbox 210, for example to inform the OS that the location information has been stored in the firmware memory 216. The SMM 214 may also store authentication information, such as sequence commands including a secure caller identifier, in the shared mailbox 210 to allow the OS to authenticate the operation status information. The SMM 214 may save multiple sets of status information to the shared mailbox 210 detailing a status of each operation performed based on information retrieved from the shared mailbox 210 by the SMM 214. When the SMM 214 has stored information in the shared mailbox 210, it may trigger a software general purpose event (GPE) in the ACPI firmware update device object 212 to inform the OS firmware update driver 202 that operation status information is available for retrieval from the shared mailbox 210. The OS firmware update driver 202 may authenticate and retrieve the operation status information. In some embodiments, when the OS firmware update driver 202 determines that the SMM 214 has stored the firmware update location information in the firmware memory 216, the OS firmware update driver 202 may proceed to reboot the system and apply the firmware update to the BIOS. Thus, an OS may communicate firmware update location information with a BIOS via a shared mailbox 210, to allow an SMM 214 of the BIOS to store the location information in a firmware memory 216 for use by the BIOS in locating the firmware update following a reboot of the information handling system.

Figure 3:
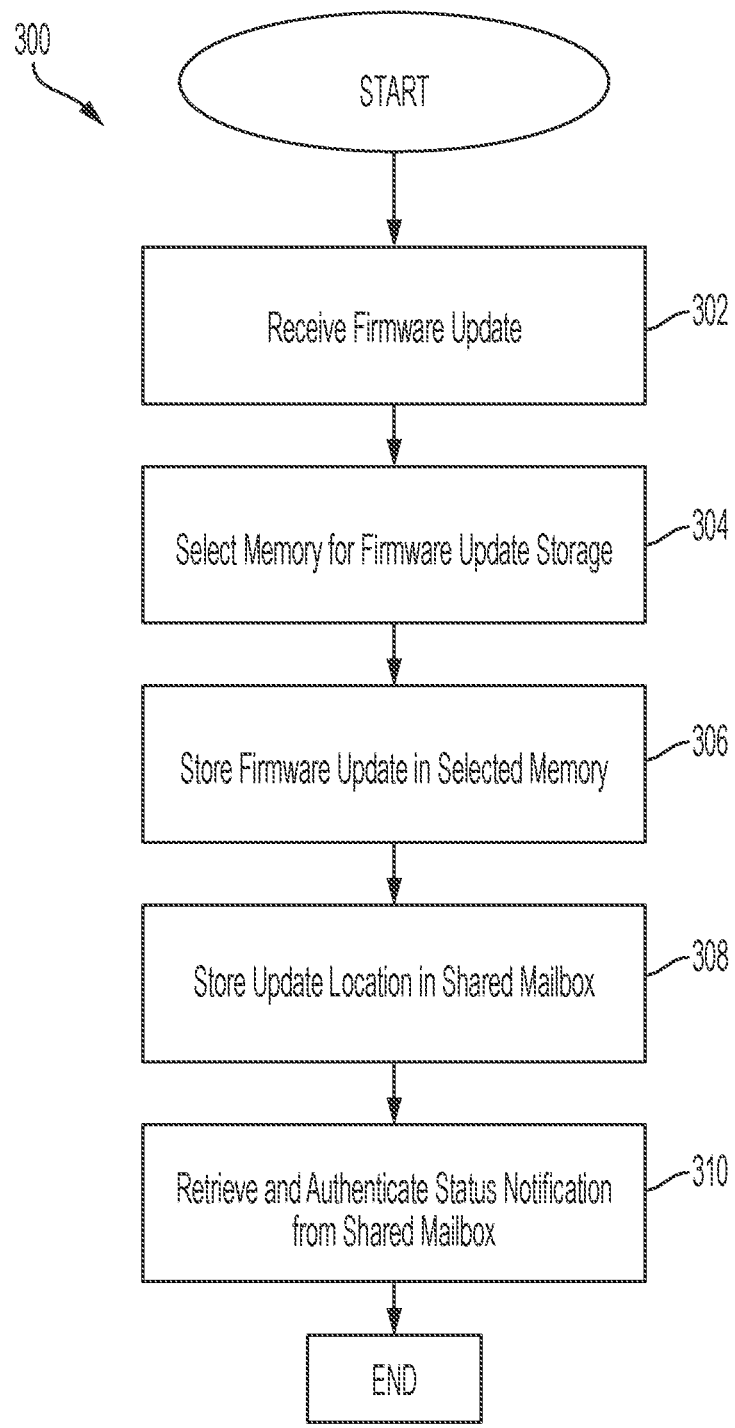
FIG. 3 is a flow chart of an example method for notifying a BIOS of a firmware update storage location according to some embodiments of the disclosure.

An OS of an information handling system may notify a BIOS of the information handling system of a storage location of a firmware update received and saved by the OS. An example method 300 of notifying a BIOS of a firmware update storage location is shown in FIG. 3. The method 300 may begin, at step 302, with receipt of a firmware update. For example, an operating system of an information handling system may receive a firmware update via a wireless connection, a computer readable medium, such as a flash drive or external hard drive, coupled to the information handling system, or another source. The firmware update may be received in a UEFI capsule format or in another file format.

At step 304, a memory may be selected for storage of the firmware update. For example, an OS of the information handling system may select a memory for storage of the firmware update. In some embodiments, the OS may select a system memory, such as a system main memory, for storage of the firmware update if a system memory is available for storage of the firmware update. If a system memory is not available for storage of the firmware update, the OS may select a solid state drive, such as an NVDIMM, for storage of the firmware update. If neither a system memory nor a solid state drive is available for storage of the firmware update, the OS may select a hard drive for storage of the firmware update. Thus, a system memory may be preferred over a solid state drive and a hard drive for storage of the firmware update, and a solid state drive may be preferred over a hard drive for storage of the firmware update. In some embodiments, the OS may select a memory for storage of the firmware update based on configuration information, such as a configuration entered by a user or received from BIOS specifying a memory for storage of the firmware update.

At step 306, the firmware update may be stored in the selected memory. For example, the OS may store the firmware update in a system memory, a solid state drive, or a hard drive. If a system memory is selected, an OS firmware update driver may request an allocation of memory for storage from an OS memory manager and may store the firmware update in the allocated memory. If a solid state drive or hard drive is selected, the OS firmware update driver may request that an OS storage driver allocate a portion of the solid state drive or hard drive for storage of the firmware update, and the OS firmware update driver may store the firmware update in the allocated memory. For example, the OS firmware update driver may request that the OS storage driver create a partition for storage of the firmware update, such as a UEFI extensible system partition (ESP) or another memory partition.

At step 308, a location of the firmware update may be stored in a shared mailbox accessible by the OS and the BIOS. For example, the OS may store firmware update location information indicating a drive in which the firmware update is stored. Firmware update location information may, for example, include a logical block address for the firmware update, a cylinder head sector for the firmware update, a device path to the memory on which the firmware update is stored, such as a device path of a hard drive, one or more non-uniform memory access (NUMA) nodes at which the firmware update is stored, a size of the firmware update, peripheral component interconnect (PCI) topology information, bus topology information, and/or a device path from host to the memory on which the firmware update is stored. In some embodiments, the OS may store authentication information in the shared mailbox, to allow the BIOS to authenticate the location information stored in the shared mailbox by the BIOS. The authentication information may, for example, include sequence commands, such as a secure caller identifier, an open NVRAM access command, and a close NVRAM access command. In some embodiments, the location information data may be contained between open NVRAM access and close NVRAM access commands. A SMM of the BIOS may authenticate the caller, for example by comparing the caller identification to an internal caller identification, and may execute the sequence commands. Authentication of location information may enhance system security by allowing the BIOS to verify that the information in the shared mailbox was stored by the OS and not by a malicious user or malicious software. The OS may also store firmware update status information in the shared mailbox to inform the BIOS of a status of update receipt and storage.

At step 310, a status notification may be retrieved from the shared mailbox. For example, when the BIOS accesses the location information in the shared mailbox and stores the location information in a firmware memory, such as a firmware NVRAM, the BIOS may save one or more status notifications, such as status reports, to the shared mailbox. The BIOS may also save authentication information, such authentication sequence commands including a secure caller identifier, for authentication of the status notifications by the OS. The OS may retrieve the status notification from the shared mailbox and, in some embodiments, may authenticate the status notification. In some embodiments, the OS may check the mailbox for status notifications upon receipt of a software general purpose event (GPE) received from an ACPI firmware update device object. In some cases, the OS may trigger a reboot of the information handling system for application of the firmware update after receipt of a status notification that the BIOS has stored the location information in a firmware NVRAM.

Figure 4:
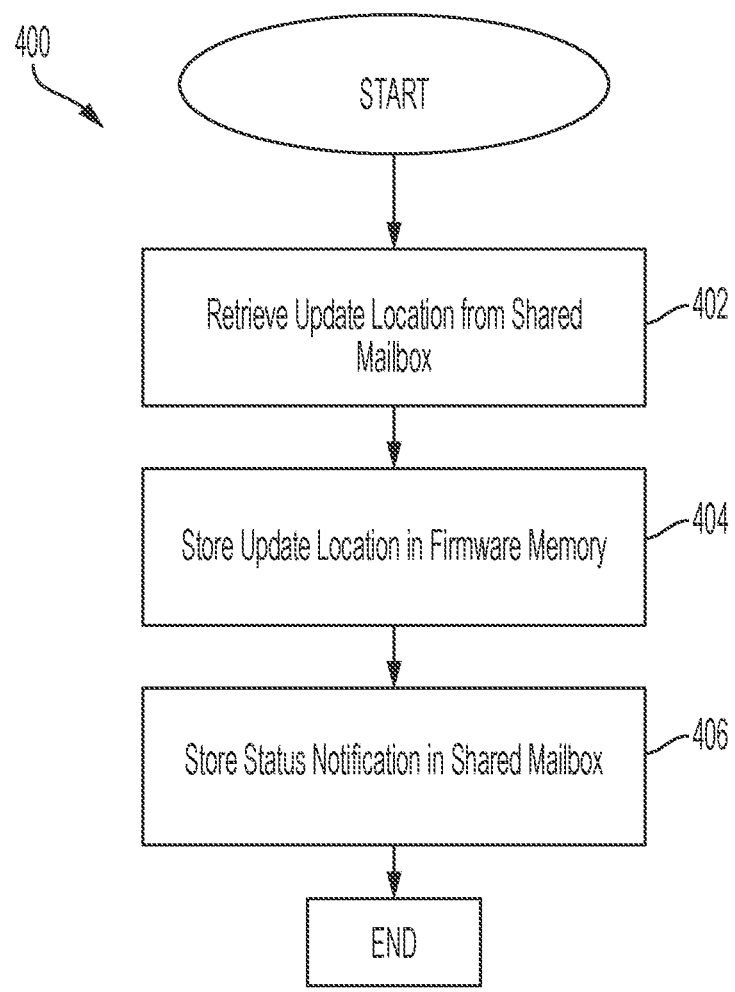
FIG. 4 is flow chart of an example method for updating, by a BIOS, firmware storage location information based on firmware location information received from an OS according to some embodiments of the disclosure.

A BIOS may access firmware update location information stored in a shared mailbox by an OS and may store the firmware update location information in a firmware memory, for access by the BIOS upon a reboot of the information handling system. An example method 400 for updating location information in a firmware memory is shown in FIG. 4. At step 402, the BIOS may retrieve firmware update location information from a shared mailbox. For example, an OS firmware update driver may notify an SMM of the BIOS, via an ACPI firmware update device object, that location information has been stored in the shared mailbox and is available for retrieval by the BIOS. For example, the OS may trigger a software system management interrupt to cause the BIOS to check the mailbox for firmware update location information. The BIOS may retrieve the firmware update location information from the shared mailbox. The BIOS may also retrieve authentication information, which may include a secure caller ID and a sequence of commands for storing the firmware update location. For example, the authentication information may be information independently and privately contained within the operation of the OS, such as within the OS firmware update driver, and the BIOS, such as within the SMM. The BIOS may check the authentication information, such as the secure caller identifier, against internal information to verify that the firmware update location information is stored by the BIOS.

At step 404, the firmware update location may be stored in a firmware memory. For example, the BIOS may store the firmware update location in a firmware memory, such as a firmware NVRAM, accessible by the BIOS while booting the information handling system. In some embodiments, storing the firmware update location in the firmware memory may include updating one or more UEFI variables to include the firmware update location information. The BIOS SMM may perform the step of storing the firmware update location. For example, after authenticating the firmware update location information, the BIOS SMM may follow a sequence of commands included in the shared mailbox to update firmware update location information in the firmware memory.

At step 404, a status notification may be stored in the shared mailbox. For example, the BIOS may store a status notification in the shared mailbox when the firmware update location is stored in the firmware memory. Storage of the status notification may be performed by the BIOS SMM. In some embodiments the BIOS may store multiple status notifications in the shared mailbox as the BIOS goes through a process of retrieving and storing a firmware update location in firmware memory. When a status notification is stored in the shared mailbox, the BIOS may notify the OS that a status notification is available for retrieval from the shared mailbox. For example, the BIOS SMM may trigger a software general purpose event in the ACPI firmware update device object to be transmitted to the OS firmware update driver 202, instructing the OS firmware update driver to retrieve the status notification from the shared mailbox. Thus, a BIOS may retrieve firmware update location information from a shared mailbox and may store the firmware update location information in a firmware memory for use by the BIOS in applying the firmware update.

Figure 5A:
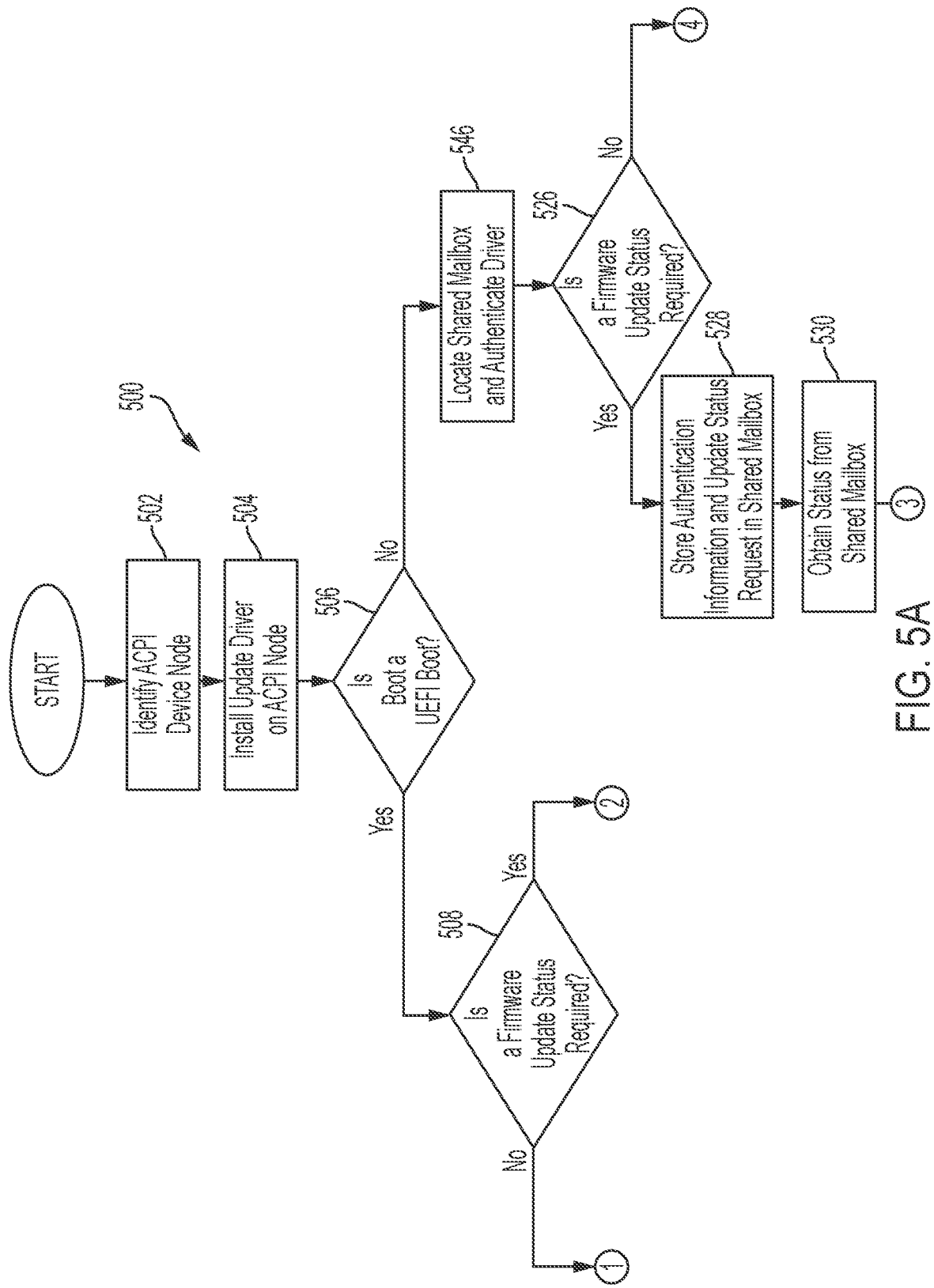
FIG. 5A is a first portion of a flow chart of an example method for storing firmware update information in UEFI and legacy BIOS systems according to some embodiments of the disclosure.
Figure 5B:
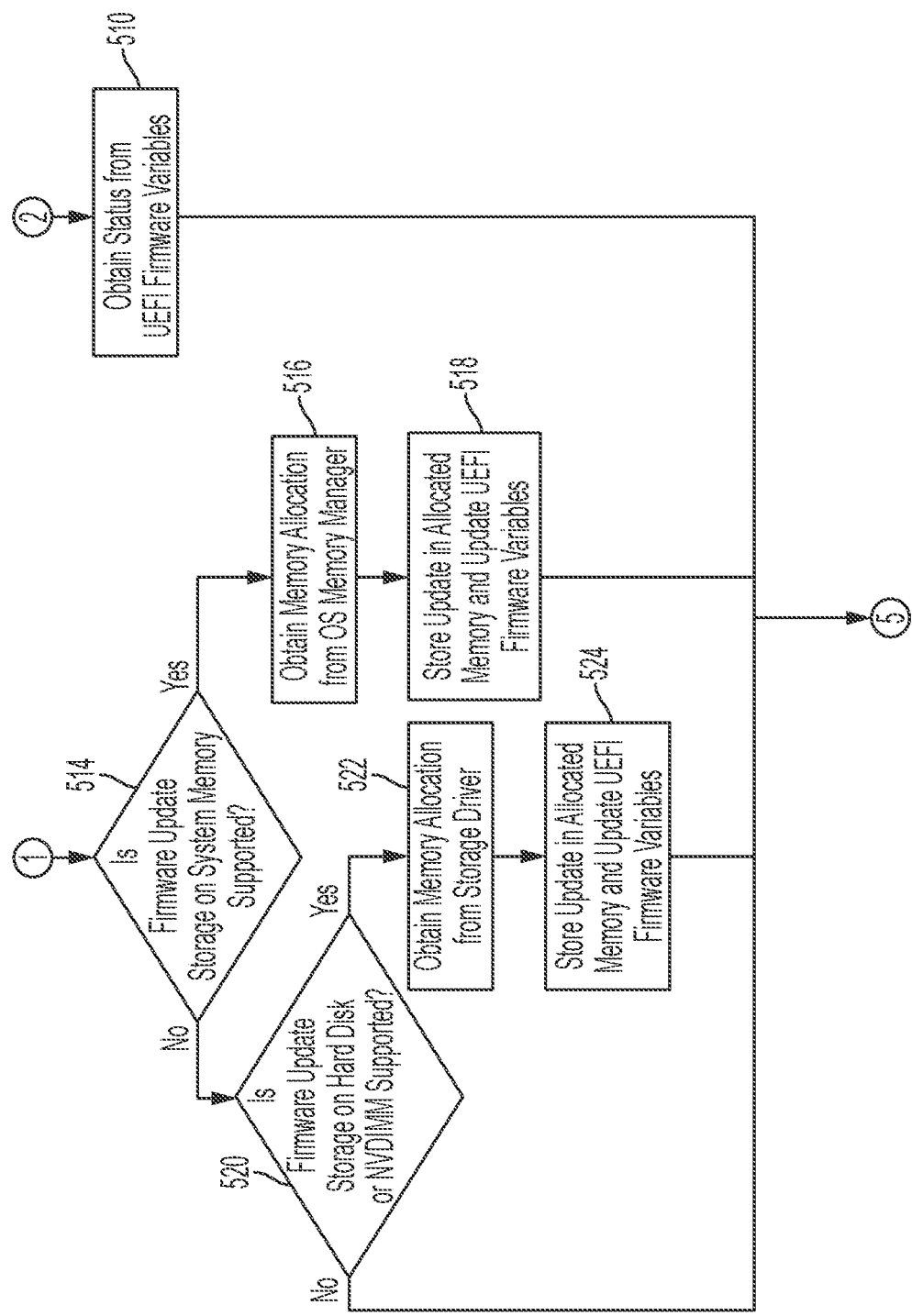
FIG. 5B is a second portion of a flow chart of an example method for storing firmware update information in UEFI and legacy BIOS systems according to some embodiments of the disclosure.
Figure 5C:
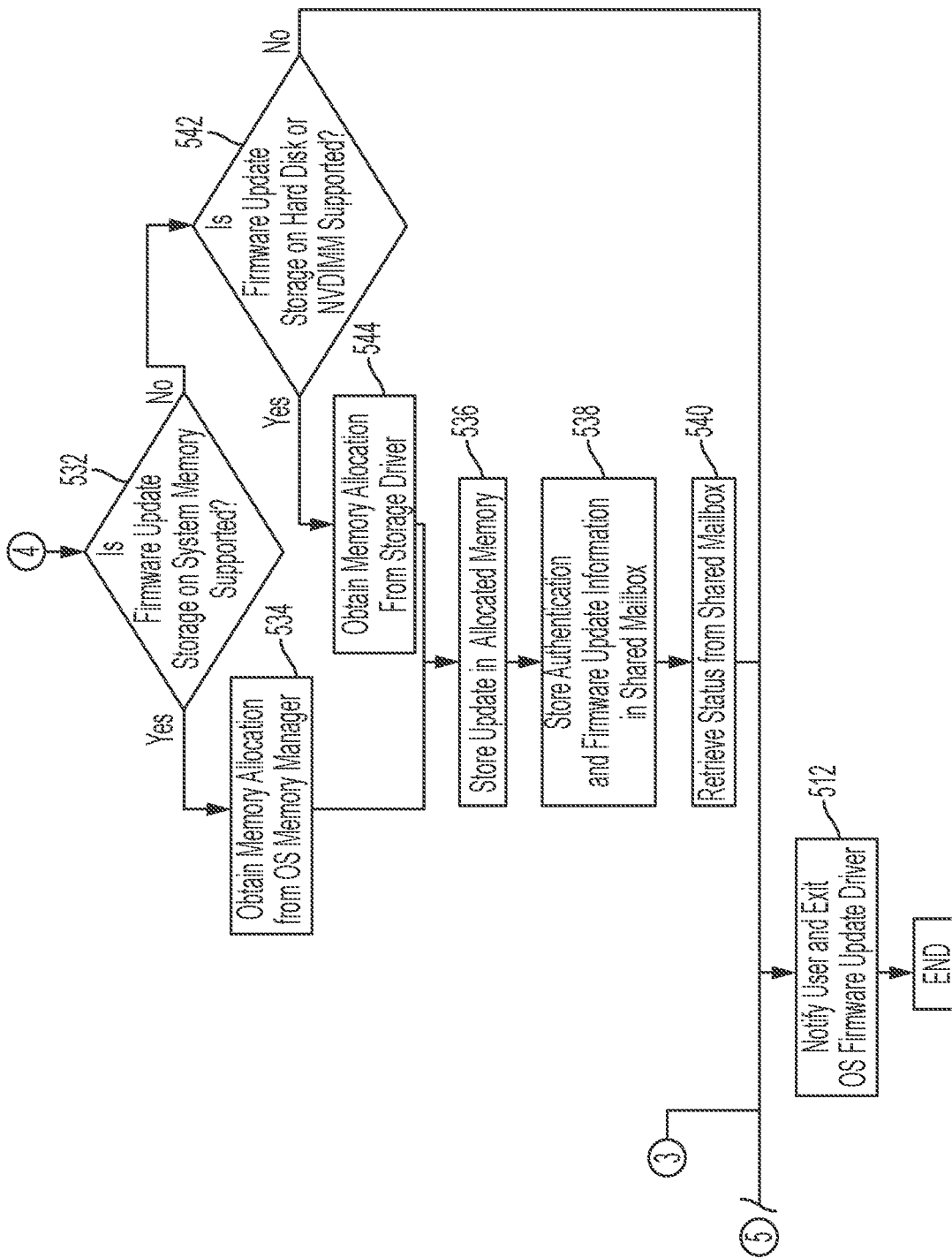
FIG. 5C is a third portion of a flow chart of an example method for storing firmware update information in UEFI and legacy BIOS systems according to some embodiments of the disclosure.

Communication of firmware update information between an OS and a BIOS via a shared mailbox may be advantageous in systems with a legacy BIOS or booted in a legacy BIOS mode. A unified OS firmware update driver across legacy and UEFI BIOS systems may allow for storage of firmware updates on system memory, a solid state drive, or a hard drive, independent of an OS executed by the information handling system or a BIOS configuration of the information handling system. A shared mailbox may allow a BIOS and OS to communicate firmware update information at OS runtime, even when an information handling system is operating in a legacy BIOS configuration. An example method 500 for receiving and storing a firmware update is shown in FIGS. 5A-C. The method 500 may begin, at step 502, with identifying an ACPI device node. For example, an OS of an information handling system may identify an ACPI device node, such as an ACPI firmware update device object, to use in installing an OS firmware update driver. The ACPI device node may be identified using a hardware identification list (_HID) ACPI object.

At step 504, the information handling system may install an OS firmware update driver on the located ACPI device node. For example, the OS of the information handling system may install the OS firmware update driver on the ACPI device node. The OS firmware update driver may retrieve location information for a shared mailbox set up by the BIOS for exchange of firmware update information between the BIOS and the OS.

At step 506, a determination may be made of whether the information handling system is booted in a UEFI BIOS configuration or a legacy BIOS configuration. Some information handling systems may only support booting in one BIOS configuration, while other information handling systems may be able to selectively boot in either a UEFI BIOS configuration or a legacy BIOS configuration. An information handling system that is booted in a UEFI BIOS configuration may allow communication of firmware update location information between the OS and the BIOS via UEFI objects, without a shared mailbox, while an information handling system that is booted in a legacy BIOS configuration may communicate firmware update location information between the BIOS and the OS via a shared mailbox.

If the information handling system is determined, at step 506, to be booted in a UEFI BIOS configuration, a determination may be made, at step 508, of whether a firmware update status is required. For example, if a firmware update was applied to the BIOS in a previous reboot, the OS may require a status of the firmware update to determine whether the update was, in fact, applied to the BIOS before storing an additional firmware update for application to the BIOS. At step 510, the operating system may obtain the firmware update status from one or more UEFI firmware variables. For example, the OS may communicate with the UEFI BIOS to obtain firmware update information, such as a status of a firmware update that was to be installed in a previous boot, from UEFI variables stored in a firmware memory. The firmware update status may indicate that a firmware update was applied to the BIOS at a previous reboot. When the OS has obtained the firmware update status, the OS may, at step 512, notify a user of the firmware update status and may exit the OS firmware update driver.

If, at step 508, a determination is made that a firmware update status is not required, the OS may, at step 514, determine whether firmware update storage on a system memory is supported. For example, the OS may determine whether storage of a firmware update on a system memory, such as a system main memory, across one or more reboots is supported. The OS may further determine whether there is sufficient space available on the system memory to store the firmware update. If, at step 514, a determination is made that storage of the firmware update on the system memory is supported, the OS may, at step 516, obtain a memory allocation of one or more portions of the system memory, such as one or more NUMA nodes, for storage of the firmware update from an OS memory manager. If a contiguous block of system memory is available for storage of the firmware update, the OS memory manager may allocate the contiguous block of system memory for storage of the firmware update. If a contiguous block of system memory is unavailable for storage of the firmware update, the OS memory manager may allocate multiple blocks of the system memory for storage of the firmware update. At step 518, the OS may store the firmware update in the allocated memory and may update location information for the firmware update in a firmware memory, such as one or more UEFI variables in a firmware NVRAM. The OS may also update other information regarding the firmware update in the firmware memory, such as an identification of the firmware update. The OS may communicate with the UEFI BIOS to facilitate storage of the location information through an ACPI device object. For example, the OS may communicate with the UEFI BIOS to securely update one or more UEFI variables with a physical memory address and/or one or more NUMA nodes at which the firmware update is stored. When the firmware update location information is stored in the firmware memory, the OS may, at step 512, notify a user of the firmware update status and may exit the OS firmware update driver.

If, at step 514, a determination is made that storage of a firmware update on system memory is not supported, a determination may be made, at step 520 of whether storage of a firmware update on a hard drive or a solid state drive, such as an NVDIMM, of the information handling system is supported. For example, the OS may determine whether a solid state drive or a hard drive is available for storage of a firmware update and/or whether the UEFI BIOS is able to access the solid state drive or hard drive to retrieve the firmware update while booting. An information handling system may include both a solid state drive and a hard drive. In some embodiments, a solid state drive, such as an NVDIMM, may be given preference over a hard drive, and a firmware update may be stored on the hard drive only if neither an NVDIMM nor a system memory is available for storage of the firmware update. If storage of the firmware update on a solid state drive or hard drive is not supported, the OS may, at step 512, notify a user that no memory is available for storage of the firmware update and may exit the OS firmware update driver.

If a determination is made, at step 520, that storage of the firmware update on a solid state drive or hard drive is supported, the OS may, at step 522, obtain a memory allocation from a storage driver of the solid state drive or hard drive. For example, if the OS determines that a solid state drive is available for storage of the firmware update, the OS may request that a storage driver for the solid state drive create a UEFI extensible system partition (ESP) or another memory partition for storage of the firmware update. If the OS determines that the firmware update should be stored in a hard drive, the OS may request that a storage driver for the hard drive create a partition for storage of the firmware update. The storage driver may return a memory address for allocated memory, such as a partition, to the OS, and the OS may, at step 524, store the firmware update in the allocated memory. The OS may further, at step 524, update a firmware memory with location information for the firmware update. For example, the OS may communicate with the UEFI BIOS to facilitate storage of the location information through an ACPI device object. The OS may communicate with the UEFI BIOS to securely update one or more UEFI variables with a memory address at which the firmware update is stored, such as a memory address of the partition. When the firmware update location information is stored in the firmware memory, the OS may, at step 512, notify a user of the firmware update status and may exit the OS firmware update driver.

If, at step 506, a determination is made that that the information handling system is not booted in a UEFI BIOS configuration, the OS may, at step 546, locate a shared mailbox and authenticate the OS firmware update driver with the BIOS. For example, if a determination is made that the information handling system is booted in a legacy BIOS configuration, a shared mailbox may be used to facilitate communication of firmware update information between the OS and the BIOS. The OS firmware update driver may communicate with an ACPI firmware update device object to obtain a location, such as a memory address, of a shared mailbox set up by the BIOS. The OS firmware update driver may populate the shared mailbox with authentication information, such as a private command sequence including a secure caller identifier for authenticating the driver. A BIOS SMM may retrieve the authentication information and may use the information to authenticate the OS firmware update driver. The OS firmware update driver may also obtain boot firmware capabilities of the BIOS, such as memories which the BIOS is able to access to retrieve a firmware update, from the SMM via an ACPI firmware update device object device specific method (_DSM).

At step 526, the OS may determine whether a firmware update status is required. For example, if a firmware update was applied to the BIOS in a previous reboot, the OS may require a status of the firmware update to determine whether the update was, in fact, applied to the BIOS before storing an additional firmware update for application to the BIOS. If a firmware update status is required, the OS may, at step 528, store authentication information and an update status request in the shared mailbox. For example, the OS firmware update driver may populate the shared mailbox with authentication information, such as a private command sequence including a secure caller identifier for authentication of the OS firmware update driver by the BIOS SMM, along with a request for a firmware update status. The OS may notify the BIOS that information is available for retrieval from the shared mailbox, for example by issuing a software system management interrupt (SMI). The BIOS SMM may retrieve and authenticate the request, may retrieve firmware update status information from one or more UEFI variables of a firmware memory, and may store the firmware update status information in the shared mailbox. The BIOS SMM may also store authentication information, such as a private command sequence including a secure caller identifier, in the shared mailbox. At step 530, the OS may retrieve the firmware update status information from the shared mailbox. In some embodiments, the OS may also authenticate the firmware update status information. At step 512, the OS may notify a user of the firmware update status and may exit the update driver.

If, at step 526, a determination is made that a firmware update status is not required, the OS may, at step 532, determine whether firmware update storage on a system memory is supported. For example, the OS may determine whether storage of a firmware update on a system memory, such as a system main memory, across one or more reboots is supported. The OS may further determine whether there is sufficient space available on the system memory to store the firmware update. If, at step 532, a determination is made that storage of the firmware update on the system memory is supported, the OS may, at step 534, obtain a memory allocation of one or more portions of the system memory, such as one or more NUMA nodes, for storage of the firmware update from an OS memory manager. For example, if a contiguous block of system memory is available for storage of the firmware update, the OS memory manager may allocate the contiguous block of system memory for storage of the firmware update. If a contiguous block of system memory is unavailable for storage of the firmware update, the OS memory manager may allocate multiple blocks of the system memory for storage of the firmware update. At step 536, the OS may store the firmware update in the allocated memory. At step 538, the OS may store authentication information and firmware update location information in the shared mailbox. For example, the OS firmware update driver may populate the shared mailbox with authentication information, such as a private command sequence including a secure caller identifier for authenticating the firmware update location information, and firmware update location information, such as a physical memory address and/or one or more NUMA nodes at which the firmware update is stored. The OS firmware update driver may also store other information regarding the firmware update in the shared mailbox, such as information identifying the firmware update and/or a size of the firmware update. The OS firmware update driver may also store a request that the BIOS SMM store the firmware update location information and the other information regarding the firmware update in a firmware memory, such as in one or more UEFI variables of a firmware NVRAM. The OS may notify the BIOS that information is available for retrieval from the shared mailbox, for example by issuing a software system management interrupt (SMI). The BIOS SMM may retrieve and authenticate the firmware update information and request and may store the firmware update location information in a firmware memory, such as in one or more UEFI variables of a firmware NVRAM. The BIOS SMM may store status information in the shared mailbox to inform the OS of actions taken to store firmware update location information. When status information is stored, the BIOS SMM may notify the OS that status information is available for retrieval from the shared mailbox, for example using a software general purpose event. The BIOS SMM may also store authentication information, such as a private command sequence, in the shared mailbox. At step 540, the OS may retrieve the status from the shared mailbox. In some embodiments, the OS may also authenticate the firmware update status. At step 512, the OS may notify a user of the status and may exit the update driver.

If, at step 532, a determination is made that storage of a firmware update on system memory is not supported, a determination may be made, at step 542 of whether storage of a firmware update on a hard drive or a solid state drive, such as an NVDIMM, of the information handling system is supported. For example, the OS may determine whether a solid state drive or a hard drive is available for storage of a firmware update and/or whether the BIOS is able to access the solid state drive or hard drive to retrieve the firmware update while booting. An information handling system may include both a solid state drive and a hard drive. In some embodiments, a solid state drive, such as an NVDIMM, may be given preference over a hard drive, and a firmware update may be stored on the hard drive only if neither an solid state drive nor a system memory is available for storage of the firmware update. If storage of the firmware update on a solid state drive or hard drive is not supported, the OS may, at step 512, notify a user that no memory is available for storage of the firmware update and may exit the OS firmware update driver.

If a determination is made, at step 542, that storage of the firmware update on a solid state drive or hard drive is supported, the OS may, at step 544, obtain a memory allocation from a storage driver of the solid state drive or hard drive. For example, if the OS determines that a solid state drive is available for storage of the firmware update, the OS may request that a storage driver for the solid state drive create a UEFI extensible system partition (ESP) or another memory partition for storage of the firmware update. If the OS determines that the firmware update should be stored on a hard drive, the OS may request that an OS storage driver allocate memory for storage of the firmware update on the hard drive. For example, the OS may request that the storage driver create a partition, such as a ESP or another memory partition, for storage of the firmware update. The storage driver may return a memory address for allocated memory, such as a partition, to the OS. At step 536, the OS may store the firmware update in the allocated memory. At step 538, the OS may store authentication information and firmware update location information in the shared memory. For example, the OS firmware update driver may populate the shared mailbox with authentication information, such as a private command sequence including a secure caller identifier for authenticating the firmware update location information, and firmware update location information. If the firmware update is stored on a solid state drive, such as an NVDIMM, firmware update location information stored in the shared mailbox may include one or more NUMA nodes at which the firmware update is stored and/or a memory channel and address range in the NVDIMM at which the firmware update is stored. If the firmware update is stored on a hard drive, firmware update location information stored in the shared mailbox may include partition information, such as logical block addressing information of the partition, a size of the firmware update and/or the partition, a cylinder head sector, and/or a device path of the hard drive, such as a storage device connection path from the host bridge. The OS firmware update driver may also store other information regarding the firmware update in the shared mailbox, such as information identifying the firmware update and a size of the firmware update. The OS firmware update driver may also store a request that the BIOS SMM store the firmware update location information and the other information regarding the firmware update in a firmware memory, such as in one or more UEFI variables of a firmware NVRAM. The OS may notify the BIOS that information is available for retrieval from the shared mailbox, for example by issuing a software system management interrupt (SMI). The BIOS SMM may retrieve and authenticate the firmware update information and request and may store the firmware update location information in a firmware memory, such as in one or more UEFI variables of a firmware NVRAM. The BIOS SMM may store status information in the shared mailbox to inform the OS of actions taken to store firmware update location information. When status information is stored in the shared mailbox, the BIOS SMM may notify the OS that status information is available for retrieval from the shared mailbox, for example using a software general purpose event. The BIOS SMM may also store authentication information, such as a private command sequence including a secure caller identifier, in the shared mailbox. At step 540, the OS may retrieve the status from the shared mailbox. In some embodiments, the OS may also authenticate the firmware update status. At step 512, the OS may notify a user of the status and may exit the update driver.

Figure 6:
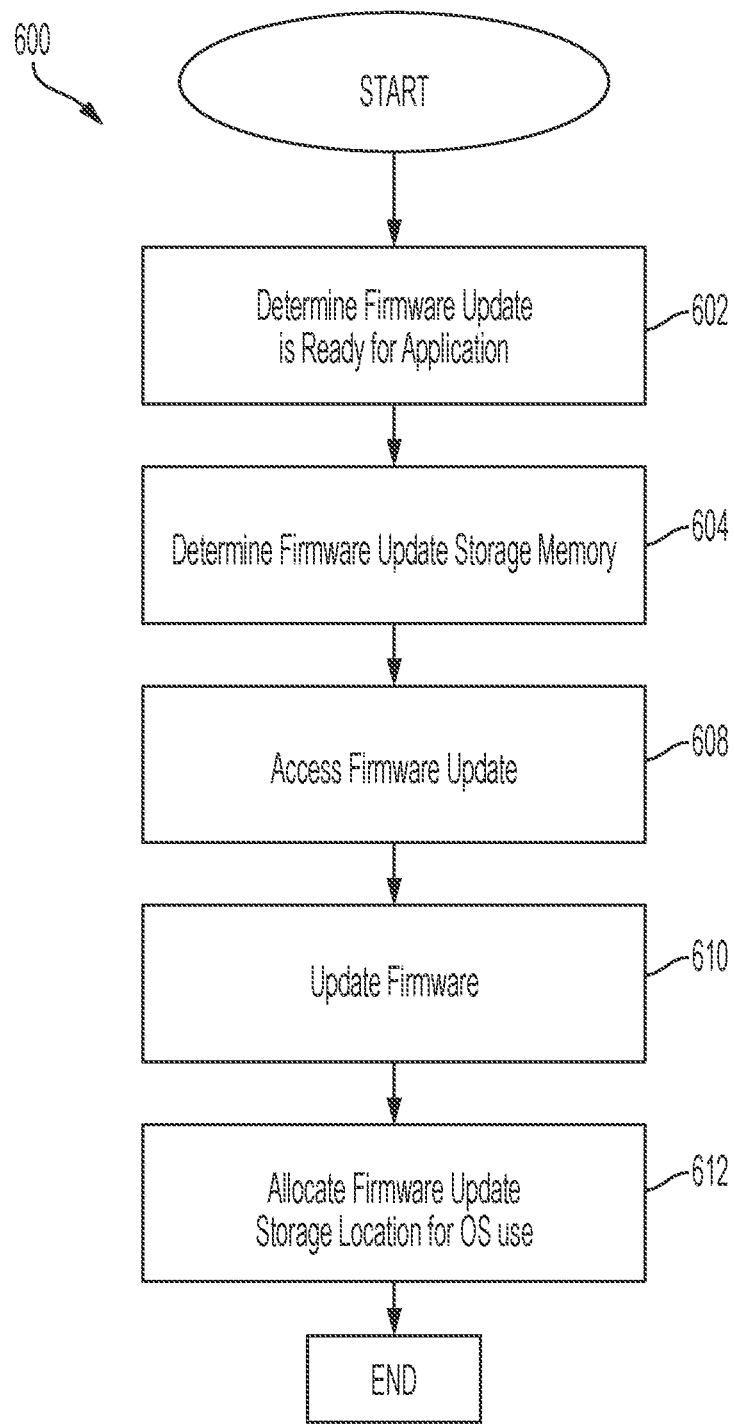
FIG. 6 is a flow chart of an example method for updating a firmware of an information handling system using firmware update location information received from an OS of the information handling system according to some embodiments of the disclosure.

When a firmware update is received and stored, and location information for the firmware update has been received by the BIOS and stored in firmware memory, the information handling system may reboot to allow for application of the firmware update. An example method 600 of updating firmware is shown in FIG. 6. The method 600 may begin, at step 602, with determining that a firmware update is ready for application. For example, an information handling system may reboot, and a BIOS may begin to initialize the information handling system following the reboot. The BIOS may check a memory flag to determine if a firmware update, such as a BIOS firmware update, is available. For example, the memory flag may include one or more UEFI variables in a firmware memory, such as a firmware NVRAM, set to indicate whether or not a firmware update has been saved to a memory for application by the BIOS.

When a determination is made that a firmware update is ready for installation, the BIOS may, at step 604, determine a memory on which the firmware update is stored. The BIOS may retrieve information designating a memory, such as a system memory, a solid state drive, or a hard drive, on which the firmware update is stored from a firmware memory, such as from one or more UEFI variables of a firmware NVRAM. The BIOS may also retrieve a location of the firmware update within the memory, such as partition information or one or more NUMA nodes at which the firmware update is stored. If the firmware update is stored in a system memory, location information retrieved from the firmware memory may include a device path for the system memory, one or more physical memory addresses within the system memory at which the firmware update is stored, and/or one or more NUMA nodes at which the firmware update is stored. If the firmware update is stored on a solid state drive, such as an NVDIMM, firmware update location information retrieved from the firmware memory may include one or more NUMA nodes at which the firmware update is stored and/or a memory channel and address range in the NVDIMM at which the firmware update is stored. If the firmware update is stored on a hard drive, firmware update location information retrieved from the firmware memory may include partition information, such as logical block addressing information of the partition, a size of the firmware update and/or the partition, a cylinder head sector, and/or a device path of the hard drive, such as a storage device connection path from the host bridge.

In some embodiments, accessing the firmware update at step 608 may also include coalescing the firmware update from a plurality of locations. For example, a firmware update stored on a system memory, such as a system main memory, may be split across a plurality of locations on the system memory. The BIOS may coalesce the firmware update from the plurality of locations into a single firmware update package at a single location on the system memory. If the firmware update is stored on a solid state drive or a hard drive of an information handling system, the BIOS may transfer the firmware update to the system memory for application.

At step 610, the BIOS may update the firmware using the firmware update. For example, if the firmware update is a BIOS firmware update, the BIOS may update the BIOS firmware using the firmware update. If the firmware update is a firmware update for another system component, such as a network interface controller, solid state drive, a general purpose graphics processing unit, or other system component, the BIOS may apply the firmware update to the system component.

After the firmware update is applied, the BIOS may, at step 612, allocate the memory used to store the firmware update for usage by the OS. For example, if the firmware update was stored in a partition of a solid state drive or a hard drive, the BIOS may instruct removal of the partition. The BIOS may also update a firmware update status in firmware memory to indicate that the firmware update is no longer available for application. In some embodiments, the information handling system may reboot after the firmware update has been applied, and the BIOS may then boot to the OS.

Figure 7A:
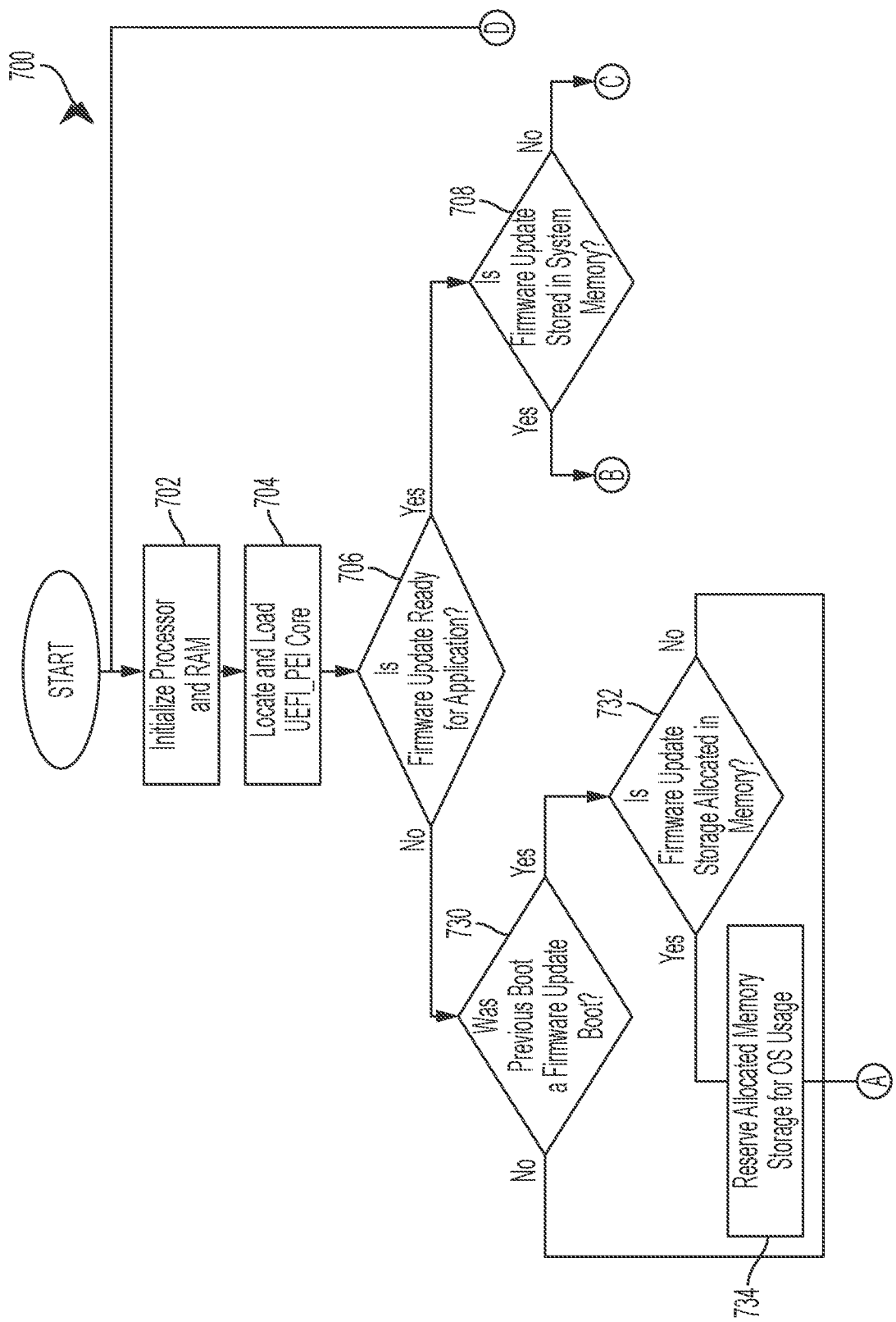
FIG. 7A is a first portion of a flow chart of an example method for booting an information handling system, according to some embodiments of the disclosure.
Figure 7B:
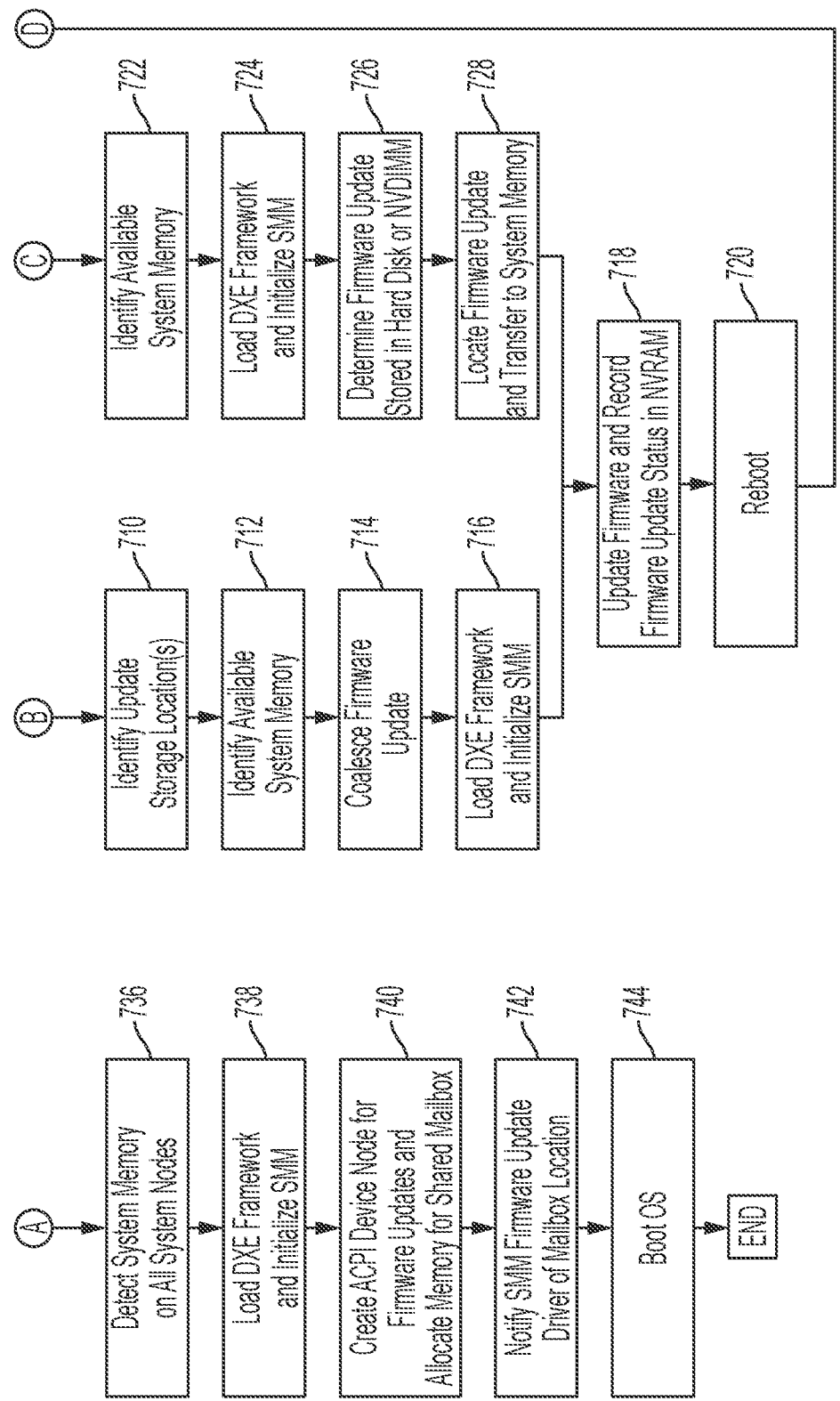
FIG. 7B is a second portion of a flow chart of an example method for booting an information handling system, according to some embodiments of the disclosure.

A BIOS of an information handling system may apply one or more firmware updates following a reboot and may reboot the information handling system following application of the firmware updates to allow for reallocation of memory storing firmware updates. A method 700 for application of firmware updates by a BIOS is shown in FIGS. 7A-B. The method 700 may begin, at step 702 with initialization of a processor and random access memory (RAM) of an information handling system. When an information handling system reboots, a BIOS may begin to boot the information handling system and may initialize a processor and RAM of the information handling system. At step 704, a UEFI pre-EFI initialization (UEFI PEI) core may be located and loaded.

At step 706, a determination may be made of whether a firmware update is ready for application. For example, the BIOS may check a firmware update indicator, such as a memory flag, to determine if a firmware update is available for application. The memory flag may include one or more UEFI variables in a firmware memory, such as a firmware NVRAM, set to indicate whether or not a firmware update has been saved to a memory for application by the BIOS, as described with respect to FIGS. 5A-C.

If a firmware update is ready for application, a determination may be made, at step 708, of whether the firmware update is stored in a system memory. For example, the BIOS may retrieve information specifying a memory in which the firmware update is stored from a firmware memory, such as from one or more UEFI variables of a firmware NVRAM. The firmware update location information may, for example have been stored in the firmware memory by the BIOS at OS runtime, as described with respect to FIGS. 5A-C. The BIOS may retrieve information designating a memory in which the firmware update is stored, such as a system memory, a solid state drive, or a hard drive, and a location of the firmware update within the memory, such as partition information or one or more NUMA nodes on which the memory is stored. If the firmware update is stored in a system memory, the BIOS may, at step 710 identify one or more locations within the system memory at which the firmware update is stored. For example, the location information retrieved from the firmware memory by the BIOS may also include information specifying where, in the system memory, the firmware update is stored, such as a device path for the system memory and one or more physical memory addresses within the system memory at which the firmware update is stored and/or one or more NUMA nodes at which the firmware update is stored.

If the firmware update is stored at multiple locations of a system memory, the BIOS may, at step 712, identify available system memory for storage of the full firmware update at a single location. For example, the BIOS may identify and detect system memory on available system memory nodes. The BIOS may then, at step 714, coalesce the firmware update from the multiple locations on the system memory at which it was stored into a single package at a single location, such as at a single NUMA node of the system memory. If the firmware update is already located in a single package at a single location on the system memory, the BIOS may bypass steps 712 and 714.

When the firmware update is coalesced, the BIOS may, at step 716, load a driver execution (DXE) framework and initialize a system management module (SMM). The BIOS may locate a prioritized module load sequence for updating the firmware and may dispatch one or more modules to initialize the system. For example, the BIOS may initialize a SMM and load one or more SMM drivers.

At step 718, the BIOS may update the firmware and may record firmware update status information in the NVRAM. For example, the BIOS may use the firmware update stored on the system memory to update a firmware. When the firmware is updated, the BIOS may update a firmware status in a firmware memory, such as a firmware NVRAM to indicate that the firmware update has been applied and that a firmware update is no longer set for application. For example, the firmware status variables updated may be the UEFI variables examined at step 706 to determine if a firmware update is available. At step 720, the BIOS may reboot the information handling system. For example, once the firmware update status is updated, the BIOS may issue a cold boot reset to reboot the information handling system, at which point the method may proceed to step 702.

At step 708, a determination may be made that the firmware update is not stored in system memory. If the firmware update is not stored in the system memory, it may require a transfer from a hard drive or solid state drive to the system memory for application. Thus, if a determination is made that the firmware update is not located in system memory, the information handling system may, at step 722, identify system memory available for storage of the firmware update. For example, the BIOS may identify and detect system memory on available system memory nodes.

At step 724, the BIOS may load a driver execution (DXE) framework and initialize a system management module (SMM). The BIOS may locate a prioritized module load sequence for updating the firmware and may dispatch one or more modules to initialize the system. For example, the BIOS may initialize a SMM and load one or more SMM drivers.

At step 726, the BIOS may determine whether the firmware update is stored in a solid state drive or in a hard drive. For example, after determining that the firmware update is not stored in a system memory at step 708, the BIOS may use the firmware update location information to determine that the firmware update is stored in a solid state drive, such as a NVDIMM, or a hard drive of the information handling system. Firmware update location information may, for example, include a globally unique identifier (GUID) identifying a memory and/or an ESP or legacy partition on which the firmware update is stored. If the firmware update is stored on a solid state drive, such as an NVDIMM, firmware update location information retrieved from the firmware memory may include one or more NUMA nodes at which the firmware update is stored and/or a memory channel and address range in the NVDIMM at which the firmware update is stored. If the firmware update is stored on a hard drive, firmware update location information retrieved from the firmware memory may include partition information, such as logical block addressing information of the partition, a size of the firmware update and/or the partition, a cylinder head sector, and/or a device path of the hard drive, such as a storage device connection path from the host bridge.

At step 728, the BIOS may locate the firmware update and may transfer the firmware update from the solid state drive or hard drive for application. The BIOS may then proceed to update firmware and record the firmware update status in NVRAM, at step 718, and may reboot the information handling system at step 720. The method may then proceed to processor and random access memory (RAM) initialization at step 702.

At step 706, the BIOS may determine that a firmware update is not ready for application. For example, when the information handling system reboots without a firmware update ready for application or when the information handling system reboots immediately following application of a firmware update, as described with respect to step 720, a firmware update indicator, such as a memory flag in a firmware memory, may indicate that a firmware update is not available for application. The BIOS may check a firmware update indicator, such as a memory flag, to determine if a firmware update is available for application. The memory flag may include one or more UEFI variables in a firmware memory, such as a firmware NVRAM, set to indicate whether or not a firmware update has been saved to a memory for application by the BIOS, as described with respect to FIGS. 5A-C.

If a firmware update is determined not to be ready for application, the BIOS may, at step 730 determine if a firmware update was applied at the previous boot. If the previous boot was a firmware update boot, the BIOS may determine, at step 732, whether a location in a memory, such as a solid state drive or hard drive, is allocated for storage of an old firmware update. For example, a firmware update that was applied at the prior reboot may still be stored in a memory. If a location in a memory is still allocated to storage of an old firmware update, the BIOS may, at step 734 reserve the portion of the memory allocated for firmware update storage for use by the OS. For example, the BIOS may reserve the region in the memory that was used for the firmware update and may mark the region as OS reserved in an extensible firmware interface (EFI) memory map, such as an E280. For example, once an update has been applied, a memory driver may update an OS memory map allowing the OS to make use of memory on which the old firmware update was stored. After booting, the OS may make use of the space and may also request, through the shared mailbox, that the BIOS clear old location information, such as information stored in UEFI variables of a firmware NVRAM, to free up space for storage of new information.

If it is determined, at step 730 that a firmware update was not applied at the previous boot, the determination, at step 732, of whether a location in a memory is allocated for storage of an old firmware update and reallocation of the allocated portion of the memory, at step 734, may be bypassed. Likewise, if, at step 732, it is determined that memory is not allocated for storage of an old firmware update, reallocation of the allocated portion of the memory, at step 734 may also be bypassed.

At step 736, the BIOS may detect system memory on all nodes. At step 738, the BIOS may load a DXE environment and may initialize an SMM. For example, the BIOS may dispatch one or more modules to initialize the system. The BIOS may initialize a SMM and load one or more SMM drivers. At step 740, the BIOS may create an ACPI firmware update device node and may allocate memory for a shared mailbox to facilitate firmware update information communication between the BIOS and the OS. The BIOS may notify a SMM of the location of the shared mailbox. For example, the BIOS may use a UEFI SMM communication procedure to notify the SMM of the shared mailbox location. Such notification may allow the SMM to inform the OS firmware update driver of the mailbox location via the ACPI firmware update device object at OS runtime. At step 744, the BIOS may boot the operating system. For example, the BIOS may detect a boot device and may boot the OS from the boot device. Thus, before booting to an OS the BIOS may establish a shared mailbox and an ACPI firmware update device object to facilitate communication of firmware update information between the OS and the BIOS at OS runtime.

The schematic flow chart diagrams of FIGS. 3-7 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for updating firmware of an information handling system, comprising:
    receiving, by an operating system (OS), a firmware update for firmware of the information handling system;
    selecting, by the OS, a memory for storage of the firmware update;
    storing, by the OS, the firmware update in the selected memory;
    storing, by the OS, a location of the firmware update in a portion of a second memory accessible by both the OS and a basic input/output system (BIOS) of the information handling system;
    retrieving, by the OS, a status notification, stored in the portion of the second memory by the BIOS, indicating that the BIOS has accessed the location of the firmware update stored in the portion of the second memory and stored the location of the firmware update in a third memory; and
    triggering, by the OS, a reboot of the information handling system to apply the firmware update based, at least in part, on retrieval of the status notification,
    wherein the stored location of the firmware update comprises an address range within the selected memory at which the firmware update is stored.

2. The method of claim 1, further comprising:
    retrieving, by the BIOS, the location of the firmware update from the second memory; and
    storing, by the BIOS, the location of the firmware update in the third memory, wherein the third memory is a firmware non-volatile random access memory (NVRAM) of the information handling system.

3. The method of claim 2, further comprising:
    storing, by the BIOS, the status notification in the portion of the second memory when the firmware update is stored in the firmware NVRAM of the information handling system.

4. The method of claim 3, further comprising authenticating, by the OS, the stored status notification prior to triggering the reboot.

5. The method of claim 1, wherein selecting a memory for storage of the firmware update comprises selecting a system memory for storage of the firmware update when the system memory is available for storing the firmware update across a reboot.

6. The method of claim 1, wherein selecting a memory for storage of the firmware update comprises:
    determining that a system memory is not available for storage of the firmware update across the reboot; and
    selecting a non-volatile dual in-line memory module (NVDIMM) for storage of the firmware update based, at least in part, on the determination that the system memory is not available for storing the firmware update across the reboot.

7. The method of claim 1, wherein selecting a memory for storage of the firmware update comprises selecting a hard disk for storage of the firmware update when neither a system memory nor a non-volatile dual in-line memory module (NVDIMM) is available for storing the firmware update across the reboot.

8. An information handling system comprising:
    a processor; and
    a memory;
    wherein the processor is configured to perform steps comprising:
        receiving, by an operating system (OS), a firmware update for firmware of the information handling system;
        selecting, by the OS, the memory for storage of the firmware update;
        storing, by the OS, the firmware update in the memory; and
        storing, by the OS a location of the firmware update in a portion of a second memory accessible by both the OS and a basic input/output system (BIOS) of the information handling system;
        retrieving, by the OS, a status notification, stored in the portion of the second memory by the BIOS, indicating that the BIOS has accessed the location of the firmware update stored in the portion of the second memory and stored the location of the firmware update in a third memory; and
        triggering, by the OS, a reboot of the information handling system to apply the firmware update based, at least in part, on retrieval of the status notification,
        wherein the stored location of the firmware update comprises an address range within the selected memory at which the firmware update is stored.

9. The information handling system of claim 8, wherein the processor is further configured to perform steps further comprising:
    retrieving, by the BIOS, the location of the firmware update from the second memory; and
    storing, by the BIOS, the location of the firmware update in the third memory, wherein the third memory is a firmware non-volatile random access memory (NVRAM) of the information handling system.

10. The information handling system of claim 9, wherein the processor is further configured to perform steps further comprising:
    storing, by the BIOS, the status notification in the portion of the second memory when the firmware update is stored in the firmware NVRAM of the information handling system.

11. The information handling system of claim 10, wherein the processor is further configured to perform steps further comprising authenticating, by the OS, the stored status notification prior to triggering the reboot.

12. The information handling system of claim 8, wherein selecting the memory for storage of the firmware update comprises selecting a system memory for storage of the firmware update when the system memory is available for storing the firmware update across a reboot.

13. The information handling system of claim 8, wherein selecting the memory for storage of the firmware update comprises:
    determining that a system memory is not available for storage of the firmware update across the reboot; and
    selecting a non-volatile dual in-line memory module (NVDIMM) for storage of the firmware update based, at least in part, on the determination that the system memory is not available for storing the firmware update across the reboot.

14. The information handling system of claim 8, wherein selecting the memory for storage of the firmware update comprises selecting a hard disk for storage of the firmware update when neither a system memory nor a non-volatile dual in-line memory module (NVDIMM) is available for storing the firmware update across the reboot.

15. A method for updating firmware of an information handling system, comprising:
- accessing, by a basic input/output system (BIOS) of the information handling system, a location of a firmware update stored, in a portion of a first memory accessible by both an operating system (OS) of the information handling system the BIOS, by the OS;
- storing, by the BIOS of the information handling system, the location of a firmware update in a second memory of the information handling system;
- storing, by the BIOS of the information handling system, a status notification in the portion of the first memory when the location of the firmware update is stored in the second memory of the information handling system to cause the OS to trigger a reboot of the information handling system to apply the firmware update;
- determining, by the BIOS, that the firmware update is ready for installation following the reboot of the information handling system;
- determining, by the BIOS, that the firmware update is stored in a third memory;
- loading one or more drivers for operation of the third memory based, at least in part, on the determination that the firmware update is stored in of the third memory;
- accessing, by the BIOS, the firmware update; and
- updating, by the BIOS, the firmware of the information handling system.

16. The method of claim 15, wherein determining that the firmware update is stored in the third memory comprises determining that the firmware update is stored in a system memory, further comprising:
- determining, by the BIOS, that the firmware update is stored in a plurality of portions at a plurality of locations on the system memory; and
- coalescing the plurality of portions of the firmware update at the plurality of locations on the system memory into a single payload at a single location of the system memory.

17. The method of claim 15, wherein determining that the firmware update is stored in the third memory comprises determining that the firmware update is stored in a portion of a non-volatile dual in-line memory module (NVDIMM) or hard disk of the information handling system, and wherein accessing, by the BIOS, the firmware update further comprises transferring the firmware update from the NVDIMM or hard disk to a system memory of the information handling system.

18. The method of claim 17, further comprising allocating the portion of the NVDIMM or hard disk used to store the firmware update for operating system use after the firmware is updated.

19. The method of claim 15, wherein determining, by the BIOS, that the firmware update is stored in the third memory comprises determining a device path of the firmware update.

* * * * *